(12) United States Patent
Gallagher et al.

(10) Patent No.: US 8,458,730 B2
(45) Date of Patent: Jun. 4, 2013

(54) MULTI-LEVEL DRIVER CONFIGURATION

(75) Inventors: James R. Gallagher, Austin, TX (US); Binh Hua, Austin, TX (US); Hong Lam Hua, Austin, TX (US); Wen Xiong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1463 days.

(21) Appl. No.: 12/026,194

(22) Filed: Feb. 5, 2008

(65) Prior Publication Data
US 2009/0199216 A1 Aug. 6, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/327; 719/321

(58) Field of Classification Search
None
See application file for complete search history.

(56) References Cited

U.S. PATENT DOCUMENTS

| | | | |
|---|---|---|---|
| 5,412,798 A | 5/1995 | Garney | 395/500 |
| 5,701,476 A | 12/1997 | Fenger | 395/652 |
| 5,787,259 A * | 7/1998 | Haroun et al. | 709/253 |
| 5,991,822 A * | 11/1999 | Mealey et al. | 719/327 |
| 6,003,097 A | 12/1999 | Richman et al. | 710/8 |
| 6,356,916 B1 * | 3/2002 | Yamatari et al. | 707/999.201 |
| 6,434,630 B1 * | 8/2002 | Micalizzi et al. | 710/5 |
| 2003/0014561 A1 | 1/2003 | Cooper | 709/321 |
| 2003/0217255 A1 * | 11/2003 | Wyatt | 713/100 |
| 2004/0077341 A1 * | 4/2004 | Chandranmenon et al. | 455/418 |
| 2008/0155154 A1 * | 6/2008 | Kenan et al. | 710/263 |

* cited by examiner

*Primary Examiner* — Andy Ho
*Assistant Examiner* — Craig Dorais
(74) *Attorney, Agent, or Firm* — David A. Mims, Jr.; Robert V. Wilder

(57) ABSTRACT

A method, medium and implementing processing system are provided in which the Operating System (OS) driver is divided into two parts, viz. an upper level OS driver and a lower level OS driver. The lower level OS driver sets up the adapter hardware and any adapter hardware work-around. The upper level OS driver is interfaced to the OS communication stack and each can be compiled separately. The upper OS driver is compiled and shipped with the OS to make sure it is compatible with the OS communication stack. The lower OS driver, in an exemplary embodiment, is compiled and stored in an adapter flash memory. The OS dynamically combines the upper and lower OS drivers together during the load time.

14 Claims, 4 Drawing Sheets

MULTI-LEVEL DRIVER CONFIGURATION

FIELD OF THE INVENTION

The present invention relates generally to information processing systems and more particularly to a methodology and implementation for providing a multi-level OS driver system.

BACKGROUND OF THE INVENTION

Normally, the product life of the IO adapter in a computer system is 5 to 7 years. In the beginning of the product's life, there is only one level of the hardware and Operating System (OS) driver. At the end of the product's life, there will be multiple levels of hardware and multiple levels of the OS driver. When an adapter is to be replaced, all of the other adapters of the same type may also need to be replaced. There is a possibility that the OS driver level will only work well with some levels of adapter hardware. The cost for the replacement can become huge and unnecessary.

Thus, there is a need for an improved methodology and implementing system which enables a user to more easily replace input/output (I/O) adapters and to provide a system including I/O adapters which can more easily be made hardware and software compatible when replaced.

SUMMARY OF THE INVENTION

A method, medium and implementing processing system are provided in which the Operating System (OS) driver is divided into two parts, viz. an upper level OS driver and a lower level OS driver. The lower level OS driver sets up the adapter hardware and any adapter hardware work-around. The upper level OS driver is interfaced to the OS communication stack and each can be compiled separately. The upper OS driver is compiled and shipped with the OS to make sure it is compatible with the OS communication stack. The lower OS driver, in an exemplary embodiment, is compiled and stored in an adapter memory unit. The OS dynamically combines the upper and lower OS drivers together during the load time.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
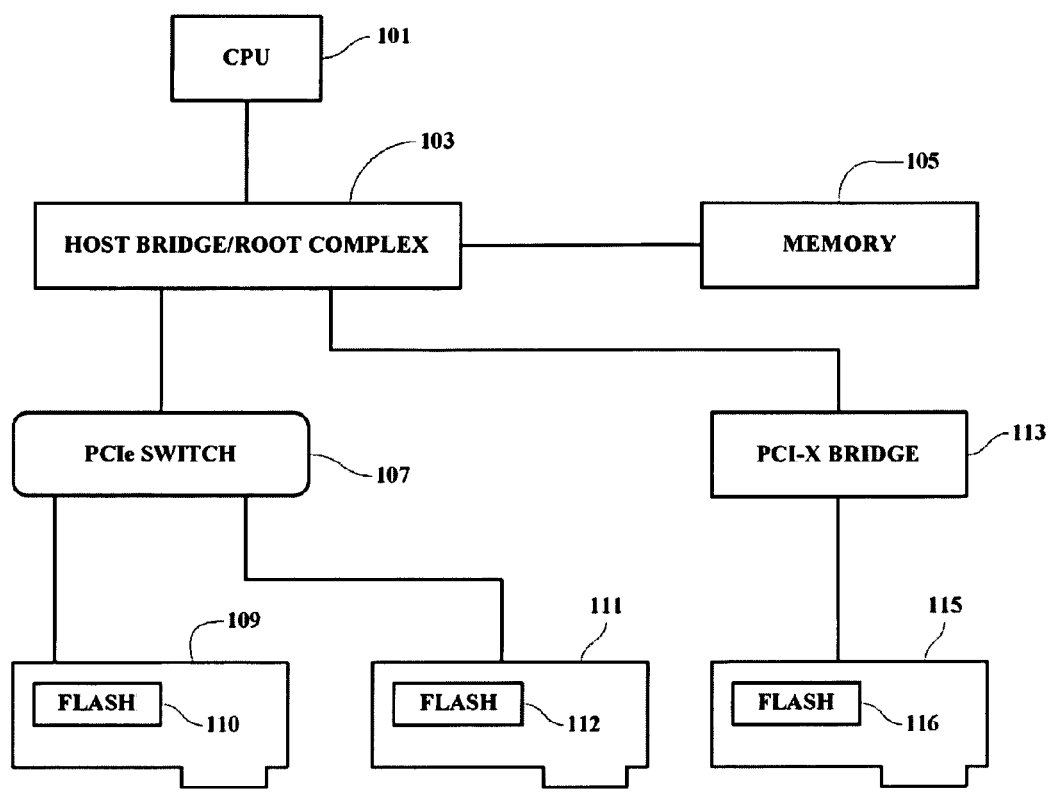
FIG. 1 is an illustration of an exemplary computer system embodiment in which the present invention may be implemented.

The various methods discussed herein may be implemented within a computing system which includes, inter alia, processing means, memory, storage, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a computer system, it is understood that the principles of the invention may be implemented in any of many available and future devices and systems.

This invention modifies the existing OS driver structure. It breaks the OS driver into two object codes, upper and lower OS driver, and stores the lower OS driver objects code in the adapter flash memory. The OS links the two objects together when it brings the adapter up. Different hardware level adapters may have the same version code for the upper OS drivers and different versions for the lower drivers.

The present disclosure divides the OS driver into two parts, the upper and lower level OS drivers. The primary function of the lower level OS driver is set up the adapter hardware and any adapter hardware work-around. The upper level OS driver is interfaced to the communication stack. Each can be compiled separately. The upper OS driver can be compiled and shipped with the OS to make sure it is compatible with the OS communication stack. The lower OS driver is compiled and stored in the adapter flash memory. The OS dynamically combines the upper and lower OS drivers together during load time.

In a system built in accordance with the present disclosure, the driver installation packet only contains the upper driver object code. The adapter is shipped with the lower driver object code in the adapter flash memory. The upper driver patch can be applied through current OS driver update methods. The patch to the lower level driver code can be released using the same methods as adapter microcode updates. For example, it erases the old code in the adapter memory and then DMA the new level code into the adapter's memory. The driver load methods upload the lower driver from the adapter and combines it with upper driver, and then loads the combined code into the kernel. Each adapter has its own copy of the driver code; the upper driver will be the same across all adapters. The lower driver may not be the same depending upon the adapter hardware level.

By current methods, systems are manufactured and shipped to the customer site. In an example, the system may have 10 Ethernet adapters and all adapter hardware is in version A.0 and software driver version 3.1. After five years of operation, one of Ethernet adapters is failing, and the current ship level of the Ethernet adapter hardware is B.8 and software driver version is 5.4. Driver version 3.1 doesn't work well with adapter version B.8 and driver version 5.4 doesn't work with adapter version A. Currently, all 10 Ethernet adapters need to be replaced to hardware level B.8 and driver version 5.4. Also, the OS may need to be upgraded to a newer version to be compatible with the driver level 5.4. This can become a major update on the system. With the new OS level, there may be some applications that will need to be upgraded to be compatible with the OS. Also, with the new OS level, there may be some other hardware (IO adapter, hard disk, memory, CPU, etc.) and software that will be incompatible and will need to be upgraded as well.

Using the methodologies disclosed herein, the computer system is manufactured and shipped to the customer site. The system, for example, has 10 Ethernet adapters and all adapter hardware is in version A.0 and software driver is divided into two parts, version u3.1 for upper OS driver and 13.1 for the lower OS driver. After five years of operation, one of Ethernet adapters is failing, and the current ship level of the failing Ethernet adapter hardware is B.8 and software driver version u5.4 and 15.4, for the upper OS driver and lower OS driver, respectively. The lower driver version 13.1 doesn't work well with adapter version B.8 and lower driver version 15.4 doesn't work with adapter version A.

Using the methodologies disclosed herein, the system administrator needs to replace only one adapter. The new adapter will run on the lower driver code differently than the other 9 Ethernet adapters. The 9 old adapters (version A.0) running with u3.1 and 13.1 version code, 1 new adapter (version B.8) running with u3.1 and 15.4 version code and no other updates are needed.

With specific reference to the drawings, in FIG. 1 there is shown an exemplary computer system configuration including a CPU 101 coupled to the host bridge/root complex 103 of the system. The host bridge/root complex 103 is coupled to system memory 105 and is also coupled to a Peripheral Component Interconnect Express (PCIe) switch 107 and a Peripheral Component Interconnect Extended (PCI-X) bridge 113. In the exemplary system, the switch 107 and bridge 113 are connected to a plurality of various adapter cards 109, 111 and 113 which provide various system functions. Adapters 109, 111 and 113 further include adapter memory units 110, 112 and 116, respectively, which may be implemented with, for example, Flash memory or other non-volatile memory units.

Figure 2:
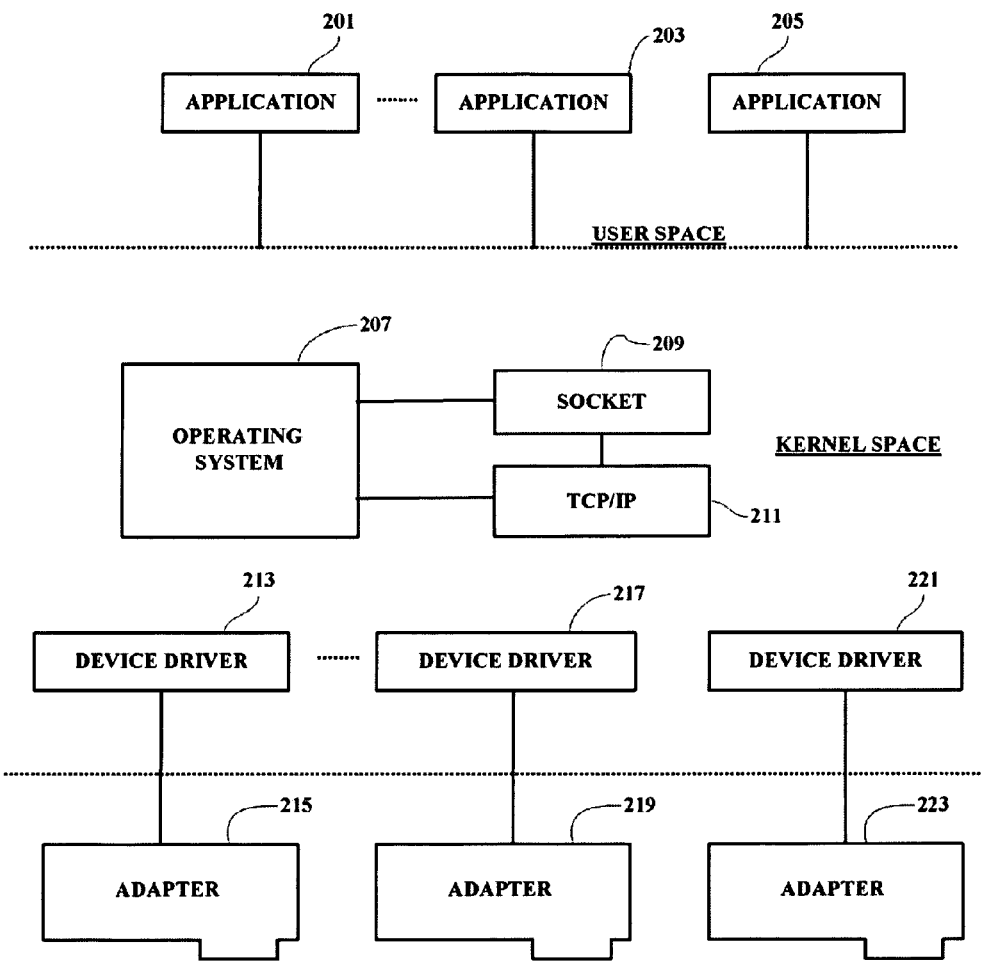
FIG. 2 is a schematic diagram showing several of the major software components of the system of FIG. 1.

In FIG. 2, a system memory map shows several applications 201, 203 and 205 running in the user space of system memory.

The kernel space of memory includes the operating system 207, which is coupled to the socket 209 and the Transmission Control Protocol and Internet Protocol unit (TCP/IP) 211. The kernel space also includes device drivers 213, 217 and 221. The device drivers 213, 217 and 221 are connected to adapters 215, 219 and 223. It is noted that in the prior art system shown in FIG. 2, all of the device driver software for the device drivers 215, 219 and 221 is located in the kernel space of memory and not in any of the adapters themselves.

Figure 3:
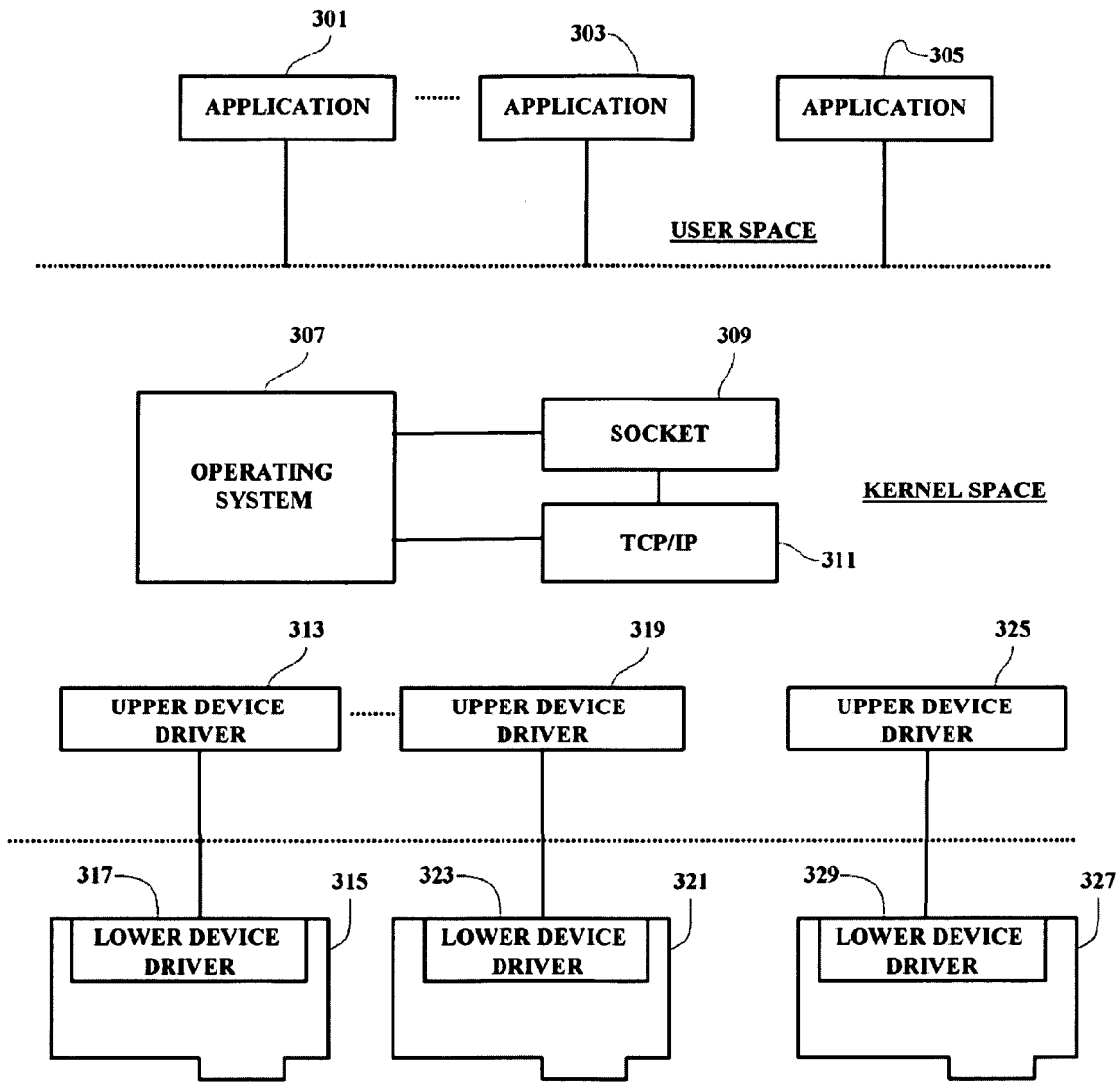
FIG. 3 is a schematic diagram showing several of the major software components of the system shown in FIG. 1 when implemented with the multi-level driver system of the present invention.

In FIG. 3, there is shown an exemplary system implementing the multi-level driver system of the present invention. As shown, exemplary applications 301, 303 and 305 are running in user space while the kernel space includes the operating system 307 coupled to the socket 309 and the TCP/IP software 311. As hereinbefore noted, in accordance with the present invention, the device driver software for each adapter is divided into the upper device driver and the lower device driver. The upper device drivers 313, 319 and 325 are contained in the kernel space while the corresponding lower device drivers 317, 323 and 329, respectively, are contained in, for example, flash memory units of respective adapters 315, 321 and 327.

Figure 4:
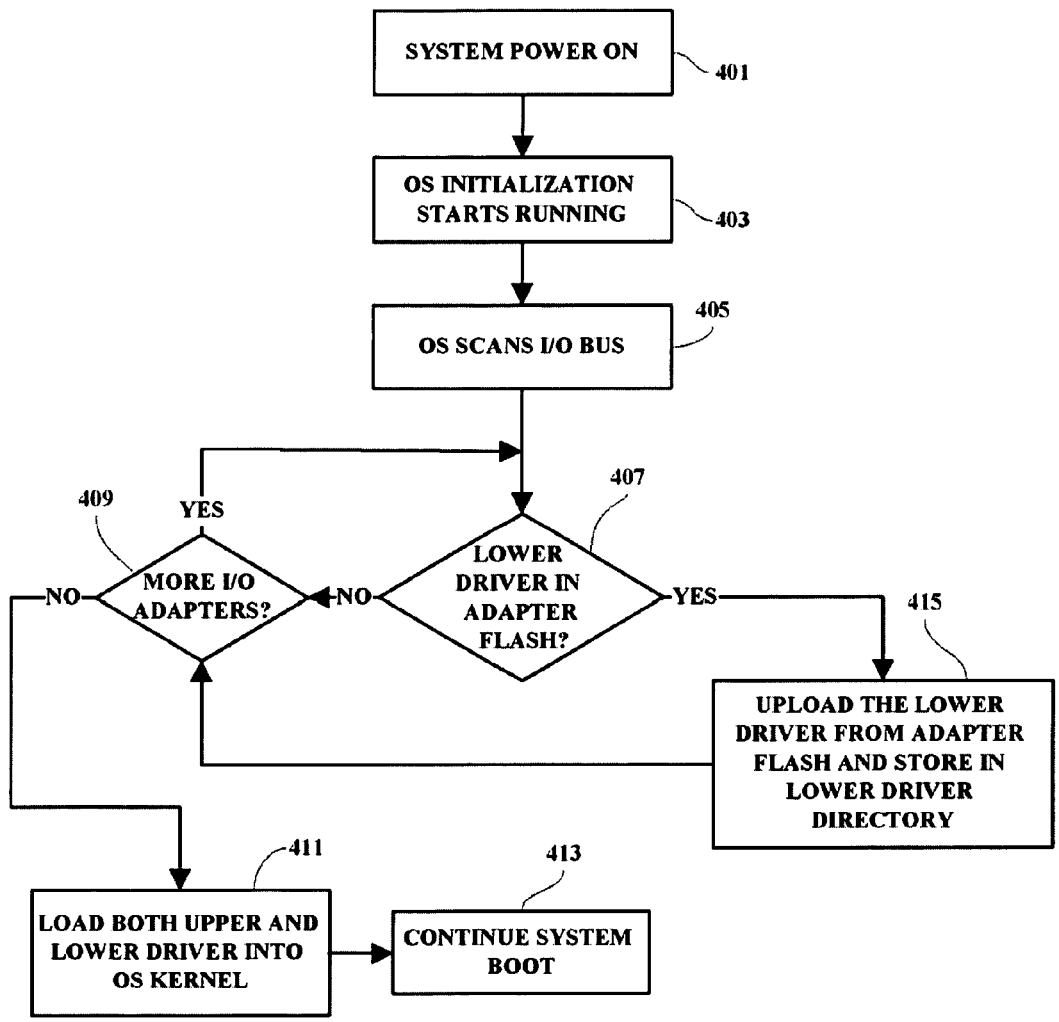
FIG. 4 is a flow chart illustrating a start-up operational sequence of an exemplary embodiment of the present invention.

In an exemplary start-up operation, as shown in FIG. 4, when the system is powered ON 401, the operating system OS runs the system initialization process 403 which includes a bus scan 405 to determine which adapters are connected in the system and which adapters have lower driver software in the adapter memory units. If the presence of a lower device driver software is detected to be in a memory unit or flash memory of an adapter 407, then the lower driver is uploaded 415 from the adapter flash and stored in the corresponding lower driver directory. If there are more I/O adapters detected 409, the process is repeated for each detected adapter. If there is no lower driver software detected in any one of the adapters 407 and there are no more adapters detected 409, then the system loads both the upper and lower drivers into the OS kernel 411 and the system continues the boot process 413.

During the OS boot up, the OS initialization code reads the lower driver from the flash memories of the adapters and stores it into the hard disk/system memory so there is a new directory for the OS file system. In the current method, there is only one directory for the I/O device driver, e.g. "-/etc/driver/Ethernet-DD". Using the new methodology of the present invention, there are two directories, one for the upper driver and the other for the lower driver. For example:

"-/etc/upper-driver/Ethernet-DD" /*upper driver for Ethernet adapter*/

"-/etc/lower-driver/Ethernet-DD" /*lower driver for Ethernet adapter*/

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including portable or fixed, volatile or non-volatile memory media device, including CDs, RAM and "Flash" memory, or other semiconductor, optical, magnetic or other memory storage media from which it may be loaded and/or transmitted into other media and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for configuring adapter driver code for an adapter device in memory kernel space of a computer system, said method comprising:

dividing said adapter driver code into an upper driver software component and a lower driver software component;

storing only said upper driver software component in said memory kernel space of said computer system in a first directory;

storing said lower driver software component in a memory unit of said adapter device, said adapter device being arranged for connection within said computer system;

scanning an input-output bus of said computer system to determine a presence of said lower driver software component within said memory unit of said adapter device;

enabling an uploading of said lower driver software component only from said adapter device to a second directory in said memory kernel space of said computer system; and dynamically combining said upper driver software component and said lower driver software component together at computer system load time, wherein, if said lower driver software component is detected to be in said memory unit of said adapter device, uploading said lower driver software component from said memory unit of said adapter device into aid second directory, and combining said lower driver software component with said upper driver software component to provide a combined driver software component to interface said adapter device to said computer system.

2. The method as set forth in claim 1 and further including:
loading said combined driver software component into a kernel of said OS of said computer system.

3. The method as set forth in claim 1 wherein said combining is accomplished at initialization of said computer system.

4. The method as set forth in claim 1 wherein said combining is accomplished when a new adapter device is coupled into said computer system.

5. The method as set forth in claim 1 wherein said memory unit of said adapter device is a non-volatile memory unit within said adapter device.

6. The method as set forth in claim 1 wherein said memory unit of said adapter device is a flash memory unit within said adapter device.

7. A computer program product comprising a computer-readable, tangible storage device(s) and computer-readable program instructions stored on the computer-readable, tangible storage device(s) for configuring adapter driver code for an adapter device in memory kernel space of a computer system, the computer-readable program instructions, when executed by a processing system, being operable for implementing a method comprising:
dividing said adapter driver code into an upper driver software component and a lower driver software component;
storing only said upper driver software component in said memory kernel space of said computer system in a first directory;
storing said lower driver software component in a memory unit of said adapter device, said adapter device being arranged for connection within said computer system;
scanning an input-output bus of said computer system to determine a presence of said lower driver software component within said memory unit of said adapter device;
enabling an uploading of said lower driver software component only from said adapter device to a second directory in said memory kernel space of said computer system; and
dynamically combining said upper driver software component and said lower driver software component together into a combined driver software component at computer system load time, wherein, if said lower driver software component is detected to be in said memory unit of said adapter device, uploading said lower driver software component from said memory unit of said adapter device into said second directory, and combining said lower driver software component with said upper driver software component to provide a combined driver software component to interface said adapter device to said computer system.

8. The computer program product as set forth in claim 7 wherein said method further includes:
loading said combined driver software component into a kernel of an Operating System (OS) of said computer system.

9. The computer program product as set forth in claim 7 wherein said combining is accomplished at initialization of said computer system.

10. The computer program product as set forth in claim 7 wherein said combining is accomplished when a new adapter device is coupled into said computer system.

11. The computer program product as set forth in claim 7 wherein said memory unit of said adapter device is a non-volatile memory unit within said adapter device.

12. The computer program product as set forth in claim 7 wherein said memory unit of said adapter device is a flash memory unit within said adapter device.

13. A processing system for configuring adapter driver code for an adapter device in memory kernel space of a computer system, said processing system comprising:
a processor device for dividing said adapter driver code into an upper driver software component and a lower driver software component;
a storage device for storing only said upper driver software component in said memory kernel space of said computer system in a first directory;
an adapter storage device for storing said lower driver software component in a memory unit of said adapter device, said adapter device being arranged for connection within said computer system;
a scanning device for scanning an input-output bus of said computer system to determine a presence of said lower driver software component within said memory unit of said adapter device;
an uploading device, for enabling an uploading of said lower driver software component only from said adapter device to a second directory in said memory kernel space of said computer system; and
combining means for dynamically combining said upper driver software component and said lower driver software component together at computer system load time, wherein, if said lower driver software component is detected to be in said memory unit of said adapter device, uploading said lower driver software component from said memory unit of said adapter device into said second directory, and combining said lower driver software component with said upper driver software component to provide a combined driver software component to interface said adapter device to said computer system.

14. The processing system as set forth in claim 13 wherein said processing system is further operable for loading said combined driver software component into a kernel of an operating system (OS) of said computer system.

* * * * *